United States Patent [19]

Matick

[11] 4,084,230
[45] Apr. 11, 1978

[54] HYBRID SEMICONDUCTOR MEMORY WITH ON-CHIP ASSOCIATIVE PAGE ADDRESSING, PAGE REPLACEMENT AND CONTROL

[75] Inventor: Richard Edward Matick, Peekskill, N.Y.

[73] Assignee: International Business Machines Corporation, Armonk, N.Y.

[21] Appl. No.: 746,033

[22] Filed: Nov. 29, 1976

[51] Int. Cl.² ................. G06F 13/00; G11C 15/04
[52] U.S. Cl. .................................................. 364/200
[58] Field of Search ................. 340/173 R, 173 AM; 364/200, 900

[56] References Cited

U.S. PATENT DOCUMENTS

| | | | |
|---|---|---|---|
| 3,569,938 | 3/1971 | Eden et al. | 364/200 |
| 3,781,808 | 12/1973 | Ahearn et al. | 364/200 |
| 3,840,863 | 10/1974 | Fuqua et al. | 364/200 |
| 3,983,537 | 9/1976 | Parsons et al. | 364/200 |
| 3,983,538 | 9/1976 | Jones | 364/900 |

Primary Examiner—Melvin B. Chapnick
Attorney, Agent, or Firm—Philip Young

[57] ABSTRACT

An associative system for providing virtual paged stores with on-chip associative address translation and control functions. Each of a plurality of integrated circuit chips contains the storage cells for a unit of data and at least one associative circuit including a virtual page address register for storing the virtual address bits assigned to each page. The CPU includes a virtual page address register and a real address register, with the CPU virtual page address register being connected to the virtual address register on each chip for interrogating the chips when a page request is made. The real address register holds the real address bits for selecting a byte of data from the chips. An interrogate virtual page address is applied to each of the chips for comparison with the address stored in the virtual page address registers, whereby a match will directly enable the selected chip to be read and/or written into. In addition to the virtual page address translation performed directly on the chip, there may also be provided on each chip a page usage information register, a page update register, as well as other control registers for storing page data which is used to determine eligibility of a page for replacement when a page fault is detected.

36 Claims, 11 Drawing Figures

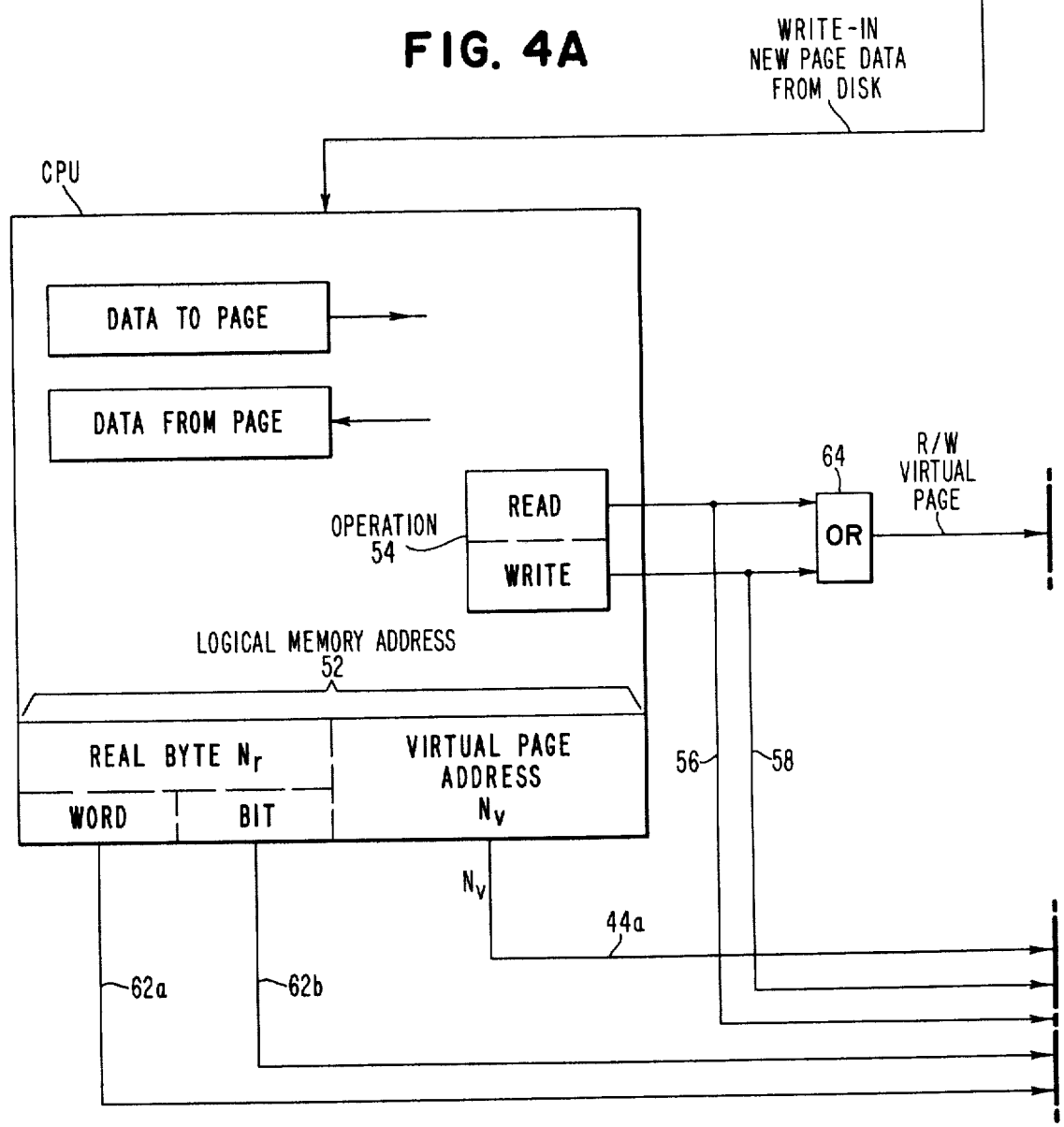

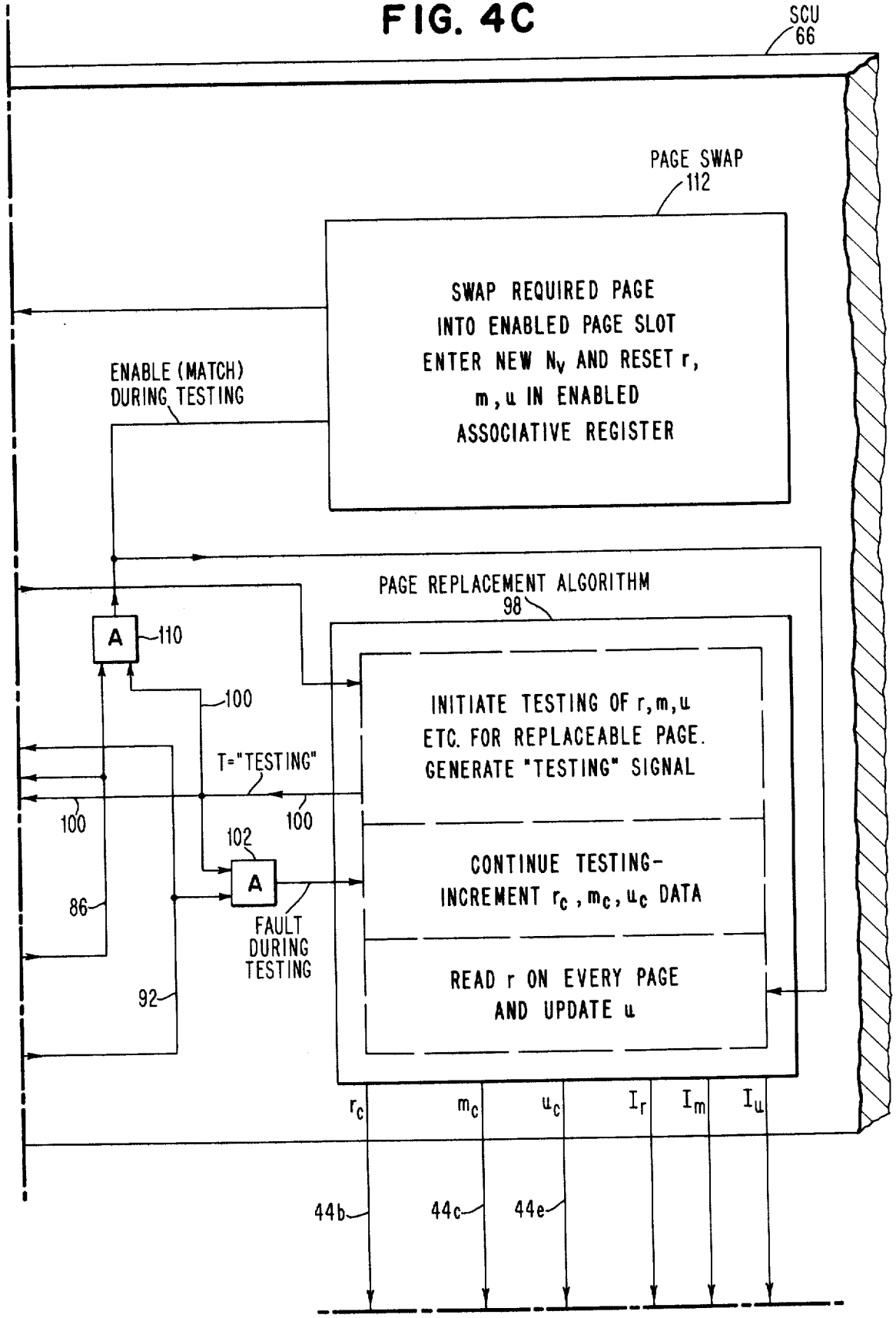

HYBRID SEMICONDUCTOR MEMORY WITH ON-CHIP ASSOCIATIVE PAGE ADDRESSING, PAGE REPLACEMENT AND CONTROL

DESCRIPTION OF THE PRIOR ART

The general concept of paged virtual stores applies both to the so-called virtual memory system (i.e., disk to main memory) and to the cache or buffer backing store system. This concept is becoming increasingly important as a means to circumvent the access time gaps between various storage technologies. One problem in today's paged systems where virtual paged hierarchies permeate throughout the system including even the microinstruction control store, i.e., Read Mostly Memory, is the translation of a large virtual address into a smaller real address. There are basically two techniques to achieve this, these being the tag directly and the table look-up. The tag directory is small in size and fast but requires many compares. To maintain the speed, simultaneous associative compares are required, making the directory very expensive. By contrast, a table look-up can be very inexpensive, using the main memory itself, but is very slow, consumes substantial amounts of main memory, and requires sophisticated hardware or software program control. In current commercial systems, the table look-up scheme backed by a very small partial directory is used for disk-main memory type of virtual stores whereas the tag directory scheme is used in cache-main memory hierarchies. It would be desirable to allow some form of an associative directory for all memory hierarchies, but this is generally too expensive with known systems.

In a two level hierarchy in which the primary store can vary over a significant range, it is essential that the mapping of primary logical to primary physical pages be fully associative, i.e., a given logical page can reside in any physical page frame (slot) in the primary store. The mapping of secondary to primary address space may be set associative. One requirement involved with directories which use a set associative secondary logical to primary logical mapping but require a fully associative primary logical to physical mapping is the need for at least two cycles. One cycle associatively accesses the directory to obtain the real, physical address of the desired page and, if that page is present, a second cycle is required to access the final data.

In current schemes, the large page tables perform the full address translation but are quite slow, requiring several main memory cycles. In order to make the system feasible, a small, fast, partial directory is used to maintain several (e.g., eight) of the most recently accessed pages. Subsequent accesses over a substantial time period will be to these pages, thus greatly improving the access time. However, this partial directory, known by various names such as Translation Lookaside Buffer (TLB) or DLAT, performs only a partial address translation since it has only a few entries. Since the TLB must be accessed first, to obtain the actual memory address, the TLB must be fast if additional delays are to be avoided. As a result, TLB's are implemented in small, bipolar register technology for speed, but at high cost. If one were to enlarge this TLB to do a full translation, it would become slow, expensive, and still require an access to the TLB for the real page address, followed by a subsequent access to the desired byte of that page.

In virtual memory hierarchies, there are three fundamental functions which must be provided, namely, a page mapping function, a virtual to real page address translation, and a page replacement algorithm. The page replacement algorithm includes the functions of page usage information and updating as well as the selection of a page for replacement when a page fault occurs. Currently, as described above for virtual page addressing, such functions are performed with special hardware or separate chips, with hard-wired algorithms for cache mainmemory hierarchies, or with tables and software algorithms for disk-main virtual memory hierarchies.

SUMMARY OF THE INVENTION

It is an object of the present invention to provide an associative directory for disk-main memory type of virtual stores and for cache-main memory type hierarchies with greater flexibility, reduced complexity and increased speed over existing virtual systems.

It is another object to provide in a virtual system, virtual page addressing, page usage information and updating, and page replacement selection using minimum logic and fewer memory cycles.

It is another object of the present invention to eliminate the second access cycle required to access page data in a two level hierarchy which uses set associative secondary logical to primary logical mapping.

It is another object to provide fully associative, virtual page address translation directly on chips wherein the chip addresses change dynamically.

It is another object to provide a hybrid technique which employs a fully associative mapping and a full address translation, and allows the virtual address decoding to be overlapped with the memory accessing.

It is another object to provide fast virtual address translation.

It is a further object to eliminate the internal page and segment tables currently used on commercial virtual storage systems for address translation.

These and other objects are achieved by the present invention which provides an associative page addressing system for providing virtual paged stores with on-chip associative address translation. Each of a plurality of integrated circuit chips contains the storage cells for a unit of data and at least one associative circuit including a virtual page address register for storing the virtual address bits assigned to each page located on one or more chips. The CPU includes a virtual page address register and a real address register, with the CPU virtual page address register being connected to the virtual address register on each chip for interrogating the chips when a page request is made. The real address register stores the real address bits for selecting a byte of data from the chips. CPU page request means include means for supplying an interrogate virtual page address from the CPU virtual page address register to each of the chips for comparison with the address stored in the virtual page register, whereby a matched virtual page address will directly enable the selected chip to be read and/or written into at those locations addressed by the real address register.

In addition to the virtual page address translation performed directly on the chip, there may also be provided on each chip a page usage information register, a page update register, as well as other control registers for storing page data which is used to determine eligibility of a page for replacement when a page fault is detected. When a request for a page is made and the virtual address from the CPU is matched on a chip, a chip enable is automatically obtained directly on the matched chip. A flag line located on each chip provides an indication to the system that a page has been enabled and, consequently, the chip data is accessed by the CPU. However, if no virtual address page match occurs on any of the chips, a page fault is detected and thereby initiates a scanner which interrogates the page usage and control bits in the registers located on each chip. In a similar associative manner, process identification bits can be stored and interrogated to provide storage protection and/or page sharing among different users.

The use of on-chip associative logic for virtual addressing provides a fully associative virtual page address translation function which circumvents the second access cycle normally required in cache systems, or completely avoids the slow table look-up in main disk-type systems. In addition to the on-chip virtual page addressing function, the page usage information and updating function as well as the page selection for replacement function when a page fault occurs, serve to either eliminate or minimize the additional hardware normally required on separate chips with a hard wired algorithm for cache or with tables and software algorithms for main-disk type virtual systems. In summary, the on-chip hybrid system permits flexibility in both the number and manner of usage of the page usage and status/control bits, thereby enabling the supervisory system to still change parameters to optimize the overall system operation in a large multi-programming environment.

BRIEF DESCRIPTION OF THE DRAWINGS

FIGS. 4A through 4E show a detailed logical structure of a hybrid memory system illustrative of another embodiment of the present invention, with FIG. 4 showing the interconnections of such FIGS. 4A–4E.

DESCRIPTION OF THE PREFERRED EMBODIMENTS

Figure 1:
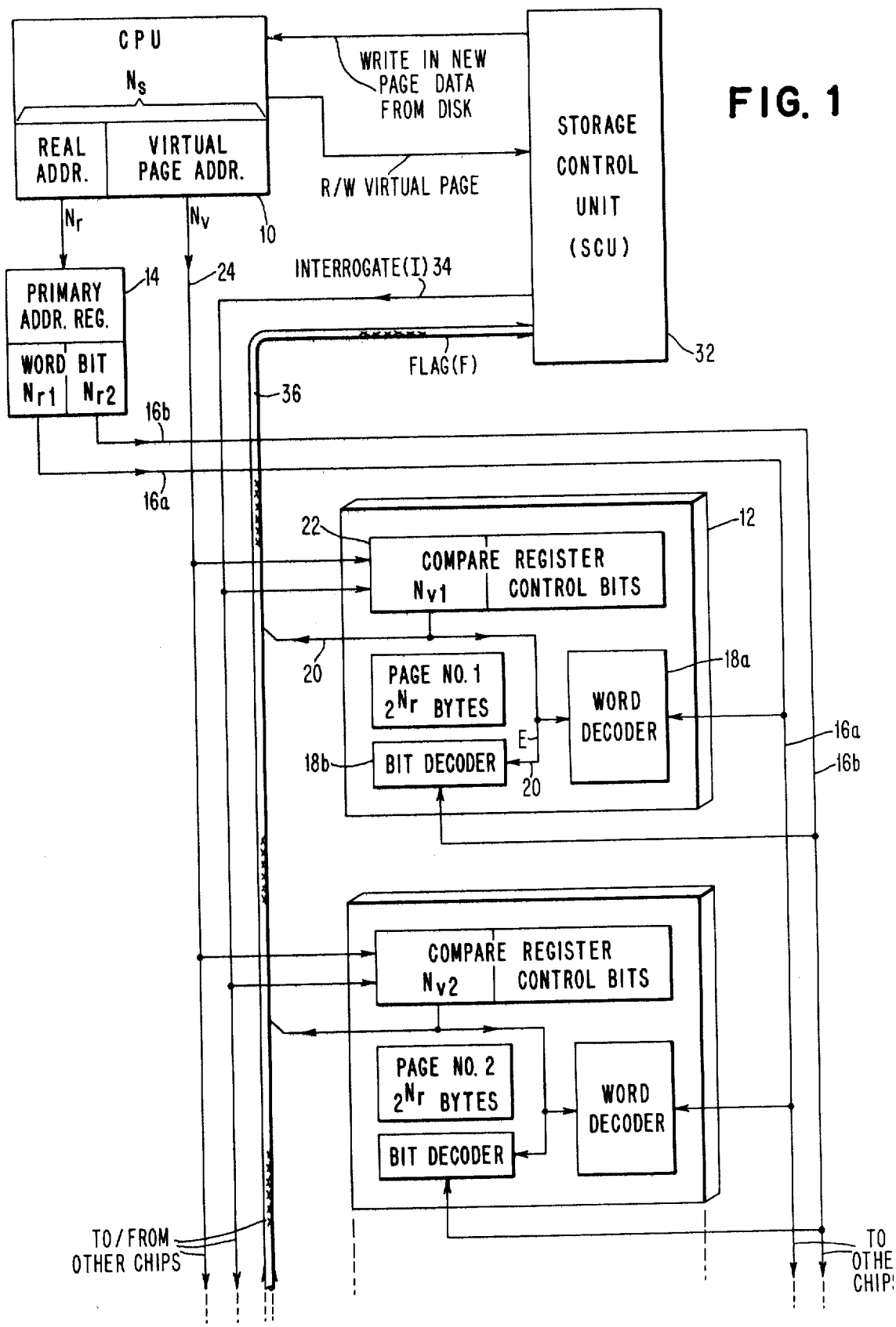
FIG. 1 shows a functional block diagram of a hybrid semiconductor random access memory configured to provide on-chip associative address translation and other functions illustrative of the present invention.

Referring to FIG. 1, there is shown one embodiment of the invention wherein a hybrid semiconductor random access memory is configured to provide on-chip associative address translation. The system is organized as one byte/chip rather than one bit/chip. This is not a basic requirement but rather reduces the number of connections and wiring paths needed. Each chip 12 is addressed through the CPU 10 by a primary address register 14 which stores the real word and bit addresses $N_{r1}$ and $N_{r2}$ for selecting the word and bit lines of all chips. It is noted that the chips are each generally indicated by the numeral 12 and may number any desirable amount in a memory. In order to assist in understanding the system, an example of some typical numbers in current use will be considered. The CPU 10 contains registers for storing a total effective virtual address $N_v$ for a virtual computing system which can be as large as 30 bits or more allowing $2^{30}$ or over $10^9$ bytes for the logical addressing capacity. The actual main memory is typically much smaller than this, for instance $2^{20}$ or one megabyte. Hence a translation of the large virtual to real main memory address is required. Only a part of the 30 bits must be translated as follows. Typical pages are 4K bytes which require 12 address bits. These are real, denoted as $N_r$ and require no associative translation. Hence, the virtual page address $N_r$ which must be associatively decoded is $$N_r = N_v - N_r = 30 - 12 = 18$$

For purposes of illustration, it is assumed that each chip 12 contains a page of 4K bytes (32K bits/chip) and since each page must be associatively decoded, then each chip 12 must be associatively decoded. This is accomplished as follows. The real address bits, $N_r$, are decoded as $N_{r1}$ and $N_{r2}$ to select a byte as would normally be done in non-associative addressing. The byte lines 16a and 16b are connected to byte groups 18a and 18b on each of the chips. Byte groups 18a and 18b respectively comprise a word decoder 18a and a bit decoder 18b commonly used on chips. This selects a byte from all chips and the proper chip is determined by a separate chip enable signal E. The present invention provides the direct enable E on line 20 of each chip generated by an associative register 22 located on-chip. All chip registers 22 have previously stored the virtual address bits, $N_v$, assigned to each page (chip) by the system supervisor. The virtual address assigned to each page can change as the pages are changed and replaced. For purposes of this discussion, an 18-bit associative register 22 is employed. These addresses ($N_v$) change dynamically with time. When a request for a virtual page, say $N_v$, is made, these bits are parallelled on line 24 to all chips. The associative registers 22 are all interrogated simultaneously by a storage control unit 32 via interrogate line 34, and only one register 22 can provide an enable signal at its line 20. The enable lines 20, also referred to as flag lines in this specification, are shown as being each connected to the SCU 32 via a cable 36. This is the selected chip and, thus, the virtual address $N_v$ is converted directly into a real address. It is to be noted that further details of the chip and the storage control unit will be provided below.

In an actual implementation of the memory, there may be provided a memory of $2^{20} = 1$ million bytes. With pages of 4K bytes each, this would require 256 pages or 256 memory chips. The memory of the present invention provides a number of advantages. All chips are identical and require no special chips for the directory. Expansion and contraction of the number of pages is inherently built into the system, since a smaller number of pages will just use 0's stored in the higher order bit positions of the associative register. Also, the decoding of the associative register 22 can be overlapped with the decoding of the bit group and word line selection, all on chip.

Figure 2A:
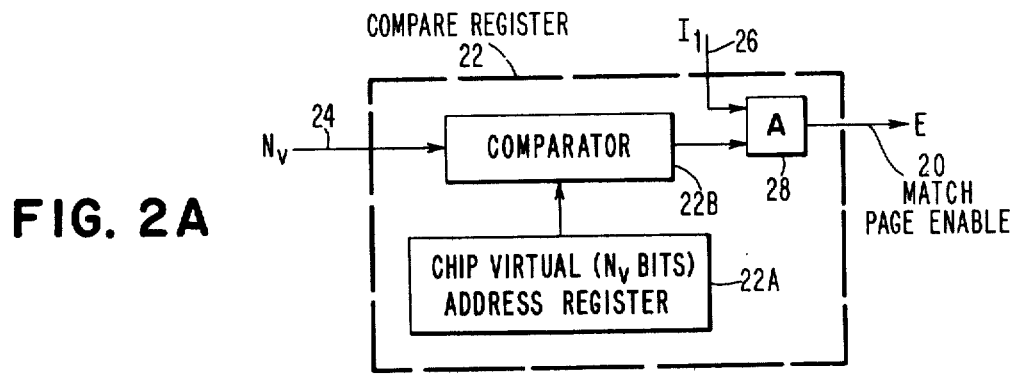
FIG. 2A is a functional block diagram of an associative compare register on each chip.

Referring to FIG. 2A, there is shown a functional block diagram of the associative compare register 22 on each chip. Register 22 includes a chip virtual address register 22A for storing the virtual address bits of the chip, and a comparator 22B for comparing the virtual address in register 22A with the interrogate virtual address line 24 from the CPU virtual page address register. It is noted that the interrogate timing can be provided on interrogate line 26 which enables the comparator 22B during the virtual address compare time by means of an AND gate 28 connected to receive the output of the comparator. A match page enable signal is provided on line 20. It is to be understood that while the description of the associative compare register 22 and its register 22A are described herein for storing and comparing the virtual address, the identical registers are employed for the page usage bit registers to be described below.

Figure 2B:
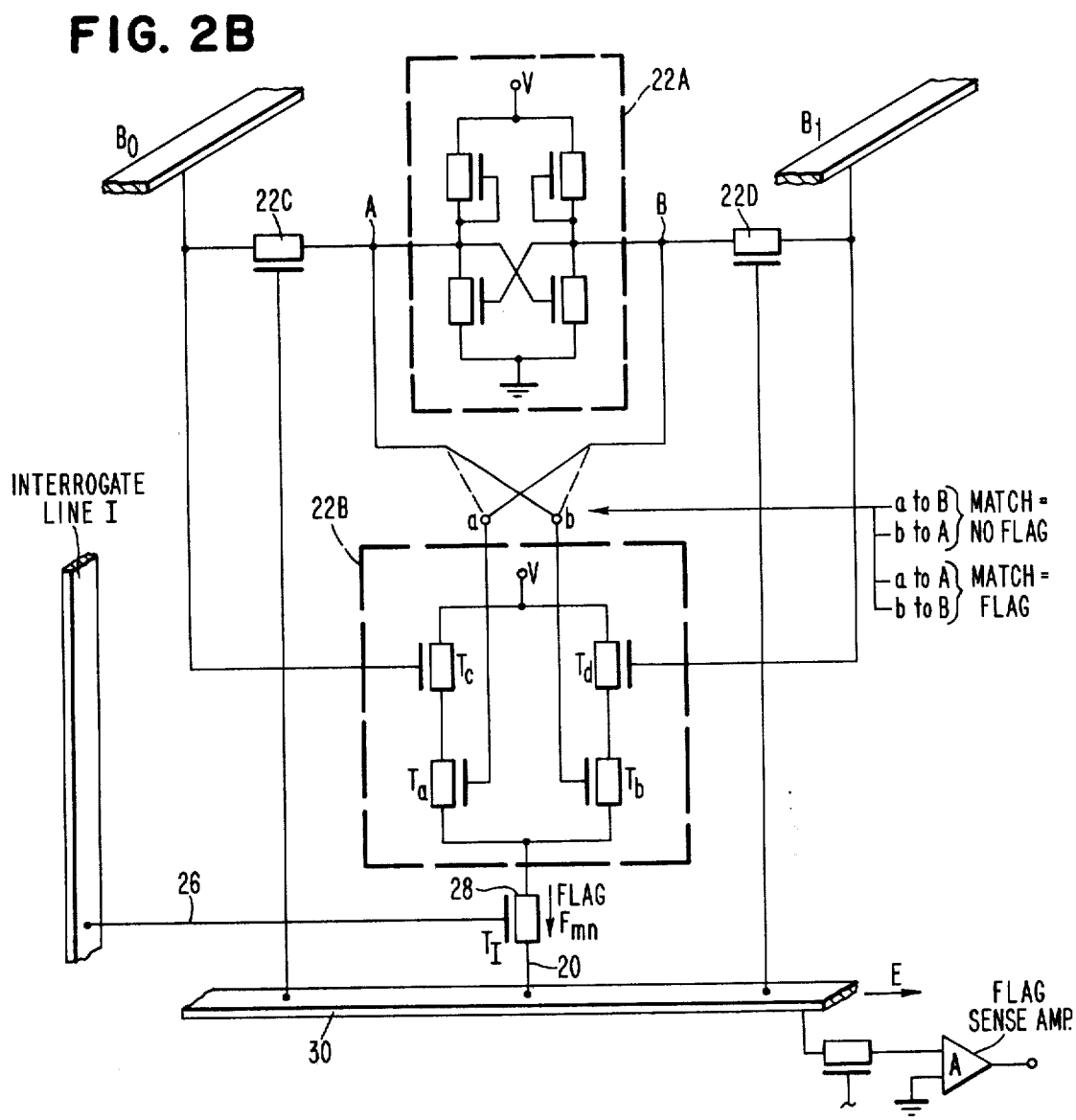
FIG. 2B shows details of the associative bit cell of an associative register shown in FIG. 2A.

Each associative bit cell of an associative register 22 can comprise the specific FET circuitry shown in FIG. 2B where equivalent devices are identified by the same numerals as in FIG. 2A. That is, the virtual address $N\nu$ is stored in the register 22A comprised of a basic four FET device flip-flop which, together with two access transistors 22C and 22D between bit line B0 and node A and between bit line B1 and node B, respectively, constitutes the random access storage section. The associative comparator 22B includes four transistors $Ta$ $Tb$ $Tc$ and $Td$ for the compare function while TI provides for separate interrogation, similar to the gate 28 shown in FIG. 2A. The read/write word line 30 also serves as the interrogate flag line 20 since the two functions are never done simultaneously. The bit-sense lines B0 and B1 are normally high, at some bias $+Vb$. A "0" is stored (written) into the basic flip-flop 22A by a negative pulse on B0 to bring it to nearly ground, in combination with a positive pulse on the word/flag line 30. This brings node A to ground while node B is high and these node voltages are set in the flip-flop 22A. A stored "1" is written by bringing node B1 to ground with a negative pulse in combination with a word line pulse, setting node B at zero and A at a high voltage. The storage cell is insensitive to disturb pulses on the word/flag line 30 as long as both bit lines are at their normally high Vb bias. An associative compare or interrogation is performed by supplying data to the bit/sense pair B0 and B1 in combination with an interrogate pulse on I line 26. External data for interrogation has the same form as that for writing, namely B0 at ground and B1 at $+Vb$ represents a "0" for comparison and just the opposite for a "1". The interrogate pulse, I, allows a flag current to flow into the word/flag line 30 if a flag is generated. Obviously, in a register consisting of many cells, the associative compare field for any given interrogation will be determined by which I lines are pulsed. For a single associative cell used above, the cell comparison logic polarity is relatively unimportant. However, in the associative register with many cells, the logic polarity is important in simplifying the circuitry. If node A is connected to $b$, and B to $a$, then a "match equal" interrogation will produce no flag, i.e., a flag indicates "no match". The opposite connections shown in dotted line will produce the opposite polarity of flag. The former logic connection (solid lines) permits all cells of the associative register to be tied in parallel to the same flag line which simplifies the circuitry. If several cells, such as the virtual address field, are interrogated simultaneously for a "compare equal" then any one of several of these cells which doesn't match the input data will produce a flag. The opposite logic of match=flag would produce some formidable sensing. For instance, in a 30 bit compare field with say 29 matches and one "no-match" we would have to be able to detect the absence of one flag current out of 30, a difficult requirement. The "flag=no match" logic simplifies this sensing problem, and is employed in the present system.

It should be noted that conventional, separate directories that are fully associatively addressed are not desirable for use in actual implementation of virtual memory systems because they tend to be slow and expensive. Thus, set associative directories are used to increase the speed and lower the cost. One problem with such separate directory is that after a match is found, a second interrogation to the "match" word is required to fetch the correct "real address". For example, in present cache memory systems, the directory is first accessed to obtain the real address of the virtual page, after which such real address is entered to access the cache. The memory system of the present invention avoids the second access delay since the match signal is used directly as the chip enable. In the system of the present invention, the address signals $N\nu$ and $Nr$ run simultaneously to all chips so there is no extra delay which would be required if $N\nu$ decoding was done elsewhere. Also, decoding of $N\nu$ is overlapped with the decoding of $Nr$. As soon as $N\nu$ is completed, it gives an immediate chip enable with no additional delay and no second access as is done with usual directories. Another advantage of the subject memory system over a typical, separate directory is the ease of expanding and contracting the number of pages. In a separate directory, a full associative word must be provided for each page. If we wish to allow for a variation of from, say 64 to 256 pages, the directory must contain the maximum of 256 entries, many of which may be empty. In the subject memory system, only two of the 18 virtual address bits in the associative registers would be empty or unused for a 64 page system, one empty for 128 pages, and none for 256 pages.

As described with respect to FIG. 1, the use of on-chip associative logic for virtual addressing enables a small amount of associative hardware on each memory chip to provide a fully associative virtual page address translation function which circumvents the second access cycle normally required in cache systems, or completely avoids the slow table look-up in main-disk type systems. The system is fully associative in that the virtual address $N_\nu$ is applied to all pages simultaneously and the associative compare operations are carried out with all addresses directly on chip.

In addition to the virtual address translation and page mapping functions in virtual memory systems, there is also required the functions of page usage information and updating and the selection of a page for replacement when a page fault or miss occurs. Currently, in known systems such functions are performed with special hardware on separate chips with a hard-wired algorithm for cache, or with tables and software algorithms for main-disk type virtual system. These latter two functions are implemented with on-chip logic functions together with the virtual address associative logic to derive certain common elements resulting in considerable simplification. In a typical operation, the CPU issues a request for a page with a virtual page address of Nv bits and a real byte address of $Nr$ bits as shown in FIG. 1. The $Nr$ bits can go directly to all pages (chips) to select a byte. The necessary logical step in the address translation is to provide one page Enable on a match to $N\nu$. For such a "match" condition, the stored bits which provide page usage information should be updated for that enabled page. When a page fault occurs, it is necessary to test the stored page usage information against various prespecified priority ranking bits and provide a page enable on a match condition. The common element in all these logical steps is the need for a page enable function which is provided by the present invention through a common associative flag line.

In addition to the mapping and address translation functions described above, a page replacement function is required on all virtual memory systems. While it is generally known that no one replacement is best for all problems, the "Least Recently Used" LRU algorithm is widely implemented in virtual memory systems. However, when there are large numbers of pages involved, the LRU becomes complex and difficult to implement. Hence it is usually used in cases where only a small number of pages is involved such as those in each of a set within a cache mapping function. Most replacement algorithms are thus only an approximation to LRU and, in fact, replace pages "Not Recently Used". Such algorithms have a substantial effect on the overall hit ratio and system performance. Hence, such algorithms are done in software which allow changes and fine tuning. The exact nature of this algorithm therefore cannot be locked into hardware but must be changeable. The system of the present invention shown in FIGS. 4A–4E allows for such changes and fine tuning.

Figure 3:
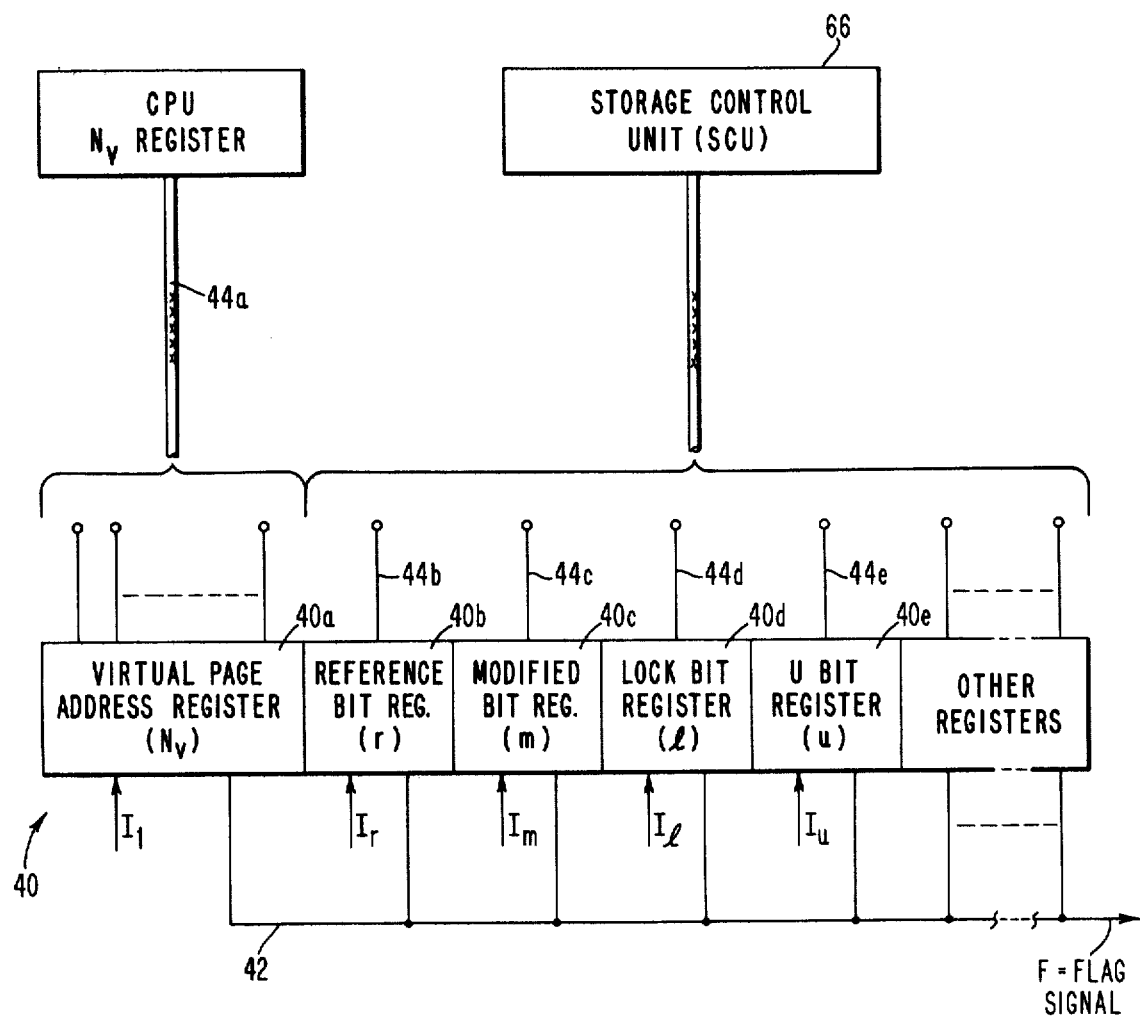
FIG. 3 is a schematic of an on-chip associative register including the virtual address translation register and the page usage and other control function registers.
Figure 4B:
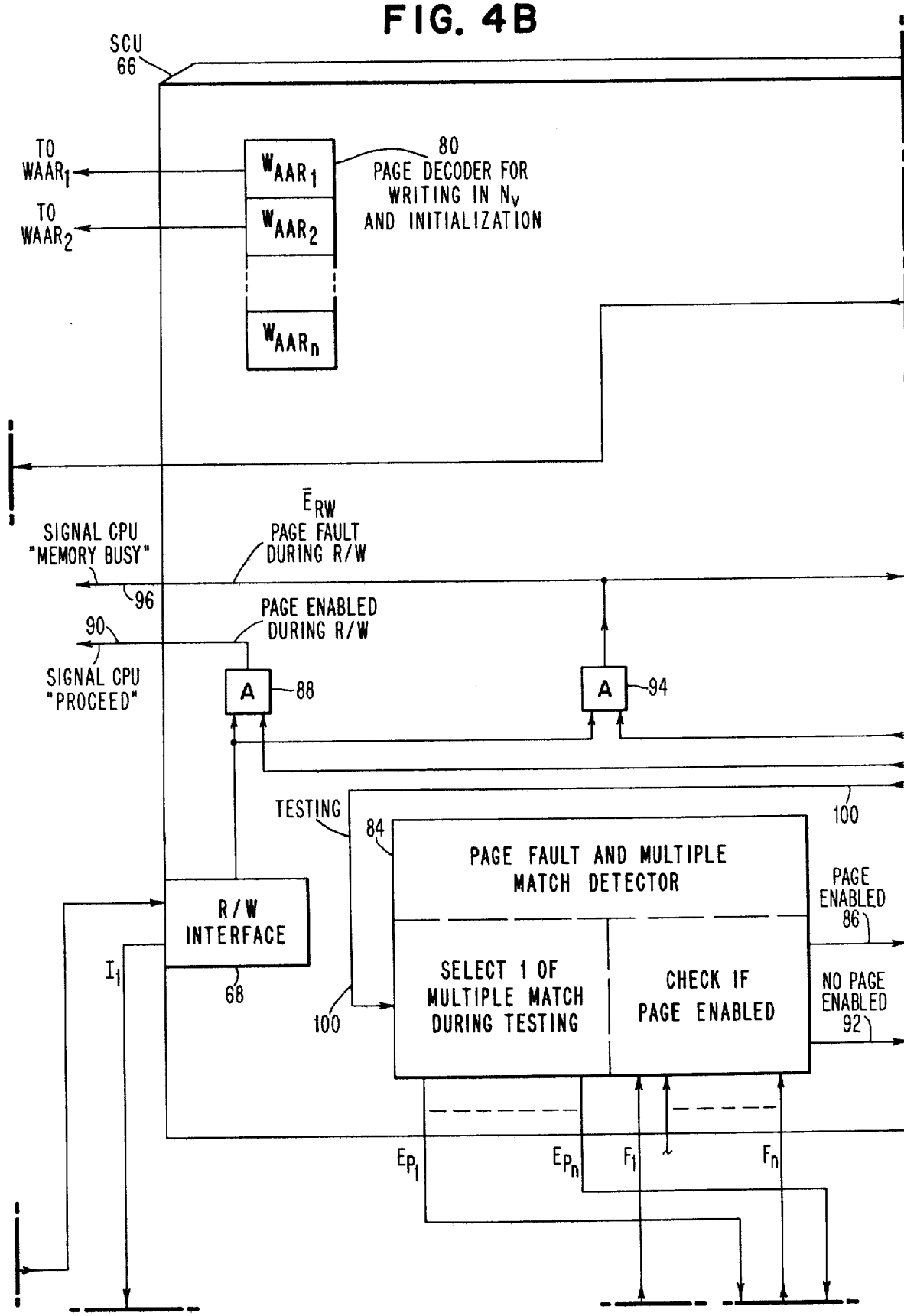
Figure 4D:
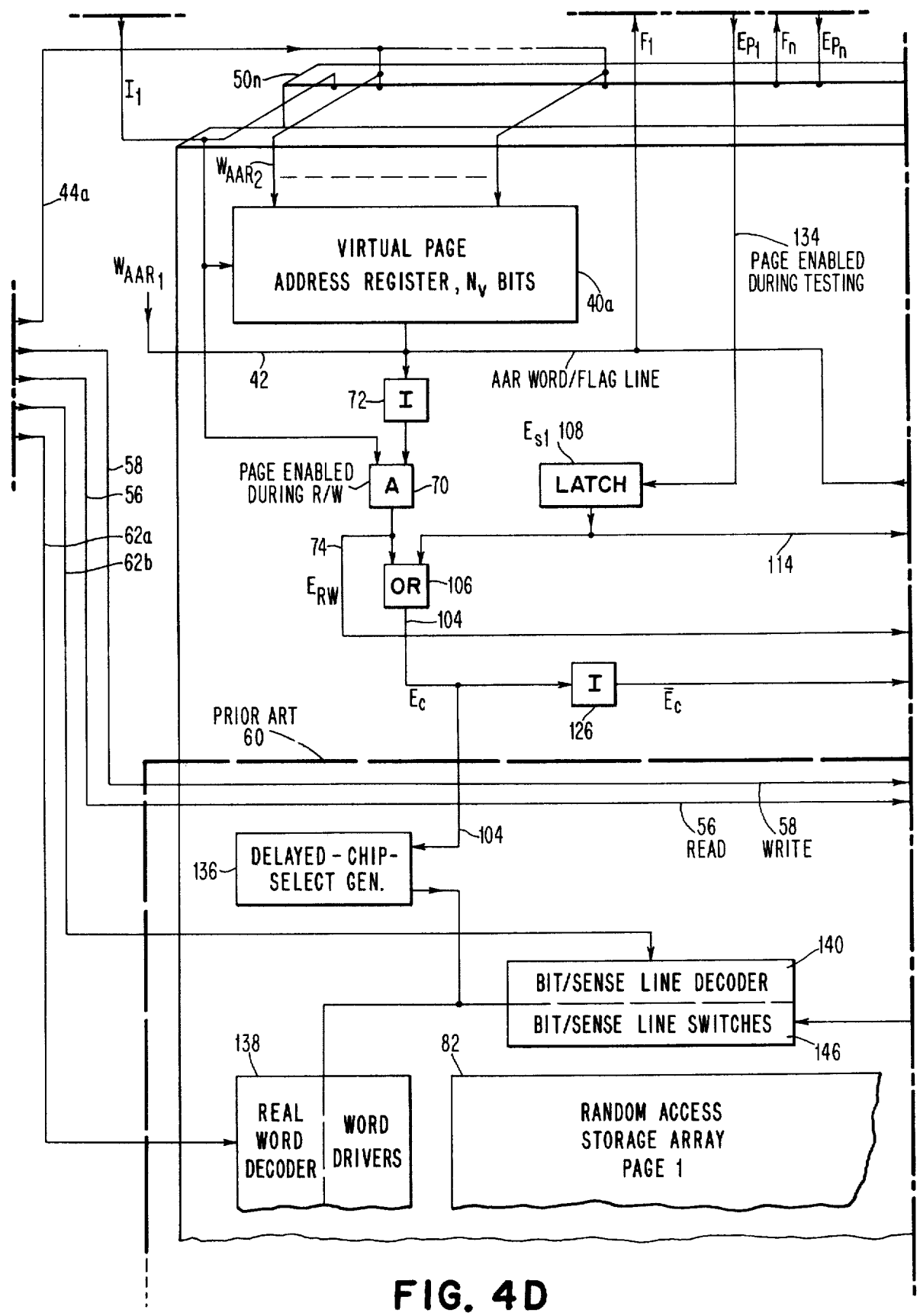
Figure 4E:
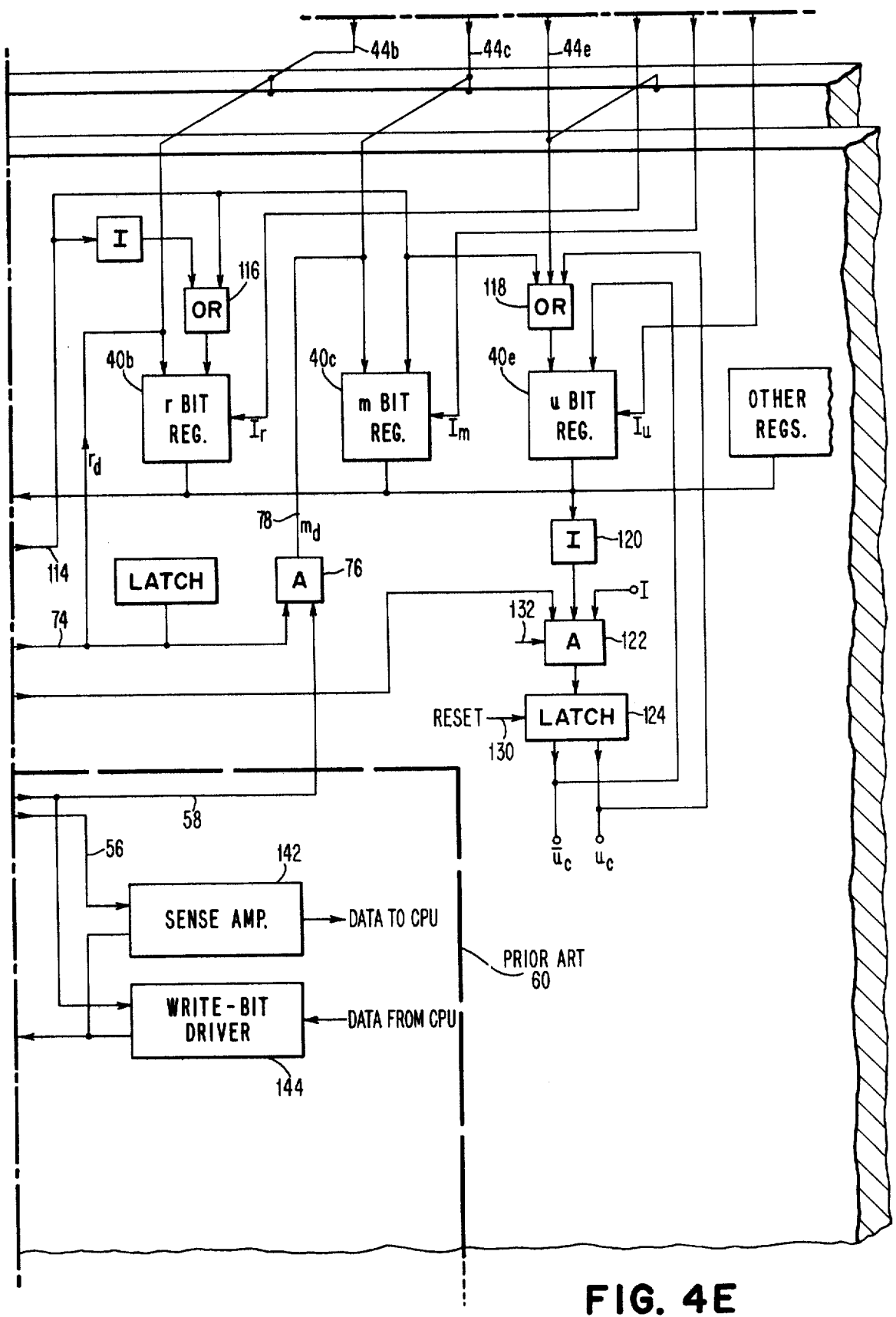

Any algorithm based upon page usage must store information about such usage. The two possible uses for a page are either "read data" or "write (modify) data". If a page has been modified, it is generally less eligible for replacement than a page not modified. This results from the fact that a modified page cannot simply be erased inside main memory but rather must first be re-written on the disk. This is a time consuming process which is to be avoided if possible. A page which has only been referenced (read) but not modified is more eligible for replacement. Two pieces of usage information employed by the system of the present invention are a reference bit $r$, and a modified bit $m$, shown in FIG. 3, stored in the associative registers 40 on each chip. Registers 40 essentially comprise a plurality of registers identical to the register 22 shown in FIGS. 1 and 2A and 2B. Specifically, in addition to a virtual address Nv bit register 40a, it also includes a reference $r$ bit register 40b, a modified $m$ bit register 40c, and registers for other control bits. The reference bit indicates whether a page has been used over some time period or scan interval. An Unreferenced Interval Count UIC or $u$ bit is used in register 40e to specify the number of scan intervals over which that page was not referenced. In addition to the $r$, $m$, and $u$ bits, other control bits can be included, such as lock bits L stored in register 40d for controlling access or sharing pages, etc. These bits are interrogated in a similar manner as described for the virtual address bits in FIGS. 1 and 2A and 2B, and share the common flag (F) line 42 shown in FIG. 3. Thus, an associative compare register 22 shown in FIGS. 2A and 2B is used as a control bit register for storing, and interrogating the $r$, $m$ and $u$ control bits in the same manner as described for the virtual address bits.

More particularly, referring again to FIG. 3, separate "interrogate" inputs I$l$, I$r$, I$m$ and I$u$ provide the associative mask or compare field. Any data present on the data-in lines 44a, b, c, and e is compared with previously stored data in the register only over that field which has an interrogate, I, input. In one implementation employed, a "match equal" produces no flag so that a flag signal in the F line 42 indicates no match. This logical structure permits the flag lines of all cells to be tied in parallel which greatly simplifies the hardware. This flag line 42 now replaces the ordinary chip enable line in typical integrated circuit memories. This flag or chip enable is used for address translation, page usage updating, and page replacement selection as will now be shown in more detail below.

Current replacement algorithms use a fixed scan interval and a reservoir of replaceable pages, some of which may be reclaimed before being swapped out to disk. A periodic scan and reservoir is needed because of the difficulty involved in searching for a replaceable page at a page fault time. In the hybrid device of the present invention the $r$ and $m$ bit updating is performed automatically and simultaneously with the addressing of a page. Furthermore, when a page fault is encountered, one page is selected for replacement by one or more associative interrogations of the usage bits. The priority scheme for replacement is specified by the Storage Control Unit, shown and described with reference to FIGS. 4A–4E, which can use microprogram control and allow for varying priority schemes. The $r$ and historical $u$ bits on all pages are automatically updated at this time while a page is being swapped. The $m$ bit is reset only when a modified page has been swapped back to disk.

FIGS. 4A through 4E illustrate how one common page replacement algorithm used in an IBM virtual storage operating system is implemented on a hybrid chip in accordance with the present invention. Here, a fully associative, on-chip page addressing, replacement and control system employs a replacement algorithm to determine eligibility of a page for replacement when a miss occurs. The embodiment of FIG. 4 discloses the detailed logical functions during memory access, with each chip equaling a virtual page. The CPU generates the total Logical Memory Address Nv+Nr at 52 and Operation 54 (Read or Write, R/W), with R and W going separately on lines 56 and 58 to each chip as usual, to initiate correct operation. This is shown as part of the old or conventional functions, indicated in the dotted line block 60. The virtual address Nv goes on line 44a to the address parts of all chip associative registers 40a, Nr on lines 62a and 62b to all chips. The R/W signal on lines 56 and 58 is ORed in gate 64 to a storage control unit (SCU) 66 which generates at the appropriate time via a R/W interface gate 68 an interrogate address signal, I$_1$. I$_1$ goes to all chips where it is ANDed in gate 70 to associative register flag on line 42 (after inversion in inverter 72) to produce "Enabled during R/W" on line 74. Assuming a page is enabled, the $r$ and/or $m$ bits must be updated. The "Page Enabled during R/W" signal, E$_{RW}$, on line 74 will serve as input data $r_d$ into the $r$ control bit register 40b. Also, the same E$_{RW}$ is ANDed in gate 76 to the W (modified) signal on line 58 from the conventional portion 60 of the chip and provides an input data on line 78 into the $m$ bit register 40c. The associative register Word line 42 is then pulsed after the correct $r_c$ and $m_c$ data are available to set these bits of the selected page register. This word pulse can be supplied simultaneously on line 42 to all chips by a page decoder 80 in the SCU 66, or can be generated on-chip. These functions are all overlapped with reading or writing of data within the storage array 82. Within the SCU 66, the flag signals F1 to Fn from all $n$ pages are tested for a page enable in a page fault and multiple match detector 84. Detector 84 comprises conventional comparator gate circuits. If a page is enabled, the E$_T$ signal is generated on line 86 and ANDed on gate 88 with the R/W signal from interface 68 to permit the CPU to "proceed" as shown at line 90. If a "no page enabled" signal $\bar{E}_T$ is obtained on line 92 from detector 84, a page fault occurs, $\bar{E}_T$ is ANDed in gate 94 to R/W to indicate on line 96 a page fault during Read/Write, $\bar{E}_{RW}$, and locks out any further CPU requests. This same signal $\bar{E}_{RW}$ on line 96 is used to initiate the replacement algorithm logic functions in the page replacement algorithm section 98 of SCU 66. It is to be understood that page replacement algorithms, their logic operation and hardware within a storage control unit are well known in the art and therefore are not described in detail herein.

One, or if necessary a series of sequential tests are associatively performed by the SCU 66 on the control bits, $r$, $m$, and $u$. First all associative registers are simultaneously tested for $r=0$ (unreferenced) $m=0$ (unmodified), and $u=1$ (unreferenced in previous interval). This requires an interrogate signal $I_r$, $I_m$, $I_u$ from the SCU 66 to each of these three bits, in their respective chip registers 40b, 40c and 40e plus the compare-data $r_c$, $m_c$, $u_c$ on lines 44b, c and e. Also, a "testing" signal T is generated on line 100 from algorithm section 98 to activate the multiple match selector in detector 84, and to allow incrementing by means of AND gate 102 on $r_c$, $m_c$ and $u_c$ bits and continued testing should no match occur on the first test of $r=0$, $m=0$, $u=1$. Assuming no match occurs, subsequent tests can be performed with the following priority scheme:

| r=0 | m=0 | u=0 |
|-----|-----|-----|
| r=1 | m=0 | u=1 |
| etc. until finally, | | |
| r=1 | m=1 | u=0 |

During testing, a multiple match can occur, i.e., more than one page can give a flag=match for the control bit criteria supplied by the SCU 66. The multiple match selector 84 selects one of these. The circuitry for doing this can be relatively simple as described with respect to FIG. 5. This is the page which will be replaced by the new page. Two logical functions must be performed; first, the selected page must be enabled, i.e., an enable signal $E_c$ on the chip line 104 out of OR gate 106 must be turned on to allow subsequent reading-out of the old page if $m=1$, and writing-in of the new page. Second, the associative register 40a must have the new Nv entered and $r$, $m$, and $u$ reset. The turning-on of one $E_c$ on the selected chip can be accomplished in several ways. One simple method is to use separate lines, $E_{p1}$ through $E_{pn}$ from the detector 84 to each page. Only one of these lines is energized and can be used as a direct set on the $E_{sl}$ latch 108.

Another technique for turning on the $E_c$ enable line 104 is to use the flag lines themselves for two way communication. After all initial flag pulses have been received by the multiple match detector 84, the selected line can be pulsed in combination with an $I_1$ pulse to set the $E_{sl}$ latch 108. At this time, it is desirable to latch the $E_c$ chip select because a series of operations, i.e., read page, write page, and reset $r$, $m$, $u$ registers are required. A J-K toggle latch 108 can be used to set and subsequently reset $E_{sl}$ on the chip.

In the meantime, within the SCU 66, the multiple match detector 84 has generated an $E_T$ page enabled signal on line 86 which is ANDed in gate 110 with the testing signal T on line 100 to initiate the page swapping cycle. This operation is indicated by the page swap block 112 of the SCU 66, and is carried out by the conventional manner.

The page fault and subsequent testing of control bits signifies the end of a scan interval. All $r$ and $u$ bits on all unselected pages must now be updated as part of the historical record of page usage. This could be overlapped with the page swapping cycle in SCU section 112 or delayed until afterwards. Updating is done according to the following logic. If $r=0$, set $u=1$ and $r$ unchanged. In multiple $u$ systems, $u$ is incremented by $+1$. If $r=1$, set $u=0$ and $r=0$. It should be apparent that on all chips, including the enabled one, the $r$ bit is turned off. On the enabled page, $u$ must be set to 1 and $r$ as well as $m$ must be set to 0 while all other pages follow the previous logic. The output of the $E_{sl}$ latch 108 is provided on line 114 as input data to the bit lines of the $r$ $m$ and $u$ registers 40b, c and e, respectively. The input can be directly applied on the $m$ bits since it is only set to 0 when a page is swapped. However, $u$ can be set to 1 or 0 on any page, on any scan cycle while $r$ is set to 0 on all pages at scan time, and hence these bits must be ORed in gates 116 and 118, respectively. The additional $u$ inputs result from a test of the $r$ bit. The $r$ bit is tested with an $I_r$ interrogate signal and, say, $r=1$ from the SCU algorithm section 98 to all chips. The associative flag on line 42 is inverted by inverter 120 and ANDed in gate 122 to $I_r$ to set a scan latch 124. The scan latch output serves as input to the $u$ bit register 40e. If a match was obtained for say $r=1$, then the latch outputs are $u_c=0$ and $\bar{u}_c=1$. If no match was obtained, then the outputs are just reversed. All correct input data is now available on the control bits of both the enabled as well as unselected pages so that a "write assocative register" pulse, $W_{AAR}$, is applied to all chips from the SCU page decoder 80 to insert these new values. On the enabled page, $r$ and $m$ are set to zero and $u$ set to 1 by the $E_{sl}$ latch 108. On the unselected pages, $r$ is set to 0 by the inverted $E_{sl}$ latch signal, while $u$ is set by the output of the scan latch 124. On the enabled chip, the scan latch 124 is disabled by the device 126 inverted $E_c$ input to the AND gate 122 preceding the scan latch 124. The scan latch 124 can subsequently be reset at 130 by either the $I_1$ interrogate line or an ORed R/W line as shown. The scan latch 122 can be prevented from setting during testing to find a replaceable page by a simple NOT input at 132 from $I_r$, $I_m$ and $I_u$. The new value of Nv from the CPU can be entered separately by supplying a word pulse $W_{AAR}$ to the enabled chip via the page decoder 80 in the SCU 66. This decoder 80 is also used to initialize the system when pages are first loaded.

After the new page is completely entered into the primary store, the $E_s$ latch 108 is reset by a pulse on the $E_p$ line 134 and the memory is available for subsequent referencing. Interrogation and resetting of the control bits is determined by the SCU 66. The use of a programmable micro control store would allow changing of the replacement algorithm by, for example, the supervisory program to allow optimization and fine tuning. Other control bits can be included as desired. The on-chip hybrid scheme of the present invention allows flexibility in both the number and manner of usage of the page usage and status/control bits, which is very desirable. At the same time, many of the current software implemented functions are accomplished directly in hardward which not only eases the already overburdened system program, but also increases the speed.

In any memory with on-chip word and bit line decoders, the real Nr decoding must be done first, just prior to the chip enable, to prevent incorrect address selection. The hybrid chip 50n shown in FIG. 4 employs for such purposes a delayed chip select (DCS) generator 136, which DCS generator 136 is used in the IBM FET memory chips. The associative address decoding can take the place of such a generator 136, thereby further overlapping otherwise sequential functions. In this case, all real decoding is completed before the associative chip enable pulse $E_c$ becomes active on the selected page. The DCS generator 136 is located on the same chip close to its related storage array 82 for proper tracking of the FET device parameters. The use of the on-chip associative registers of the present invention provides this tracking in the natural way shown. As has been described above, the $Nr_1$ and $Nr_2$ real byte addresses are used to decode on lines 62a and 62b, respectively, the word and bit lines of all chips in the conventional manner, such as is accomplished on Riesling chips, with a real word decoder 138 and a bit/sense line decoder 140. CPU read line 56 is connected to sense amplifiers 142 on the chip which provides data to the CPU. CPU write line is connected to write-bit drivers 144 which receive data from the CPU and enter it into the storage array 82 via bit/sense line switches 146.

Thus, it has been shown how the page status and control bits can be maintained in the overall associative register and such bits can be interrogated, updated, erased, etc., in much the same manner as the virtual associative addressing. Also, the virtual memory functions necessary for the on-chip register can be controlled by the use of one flag bit, F, connected to all register cells in parallel so that the associative cells are relatively simple, requiring a very small amount of real estate and minimum wiring connections. In the fully associative register provided on-chip, the associative address compare causes the virtual page address register 40a on each chip to compare all $N_v$ address bits and provide one enable flag signal on the line 42 to enable the particular matched chip for reading or writing.

For page replacement algorithms, the on-chip registers provide a comparison of the r, m and u bits and select one page of the resulting multiple matches. The virtual address is written into the register 40a whenever a new page is entered and remains fixed until another page replaces it. The virtual addresses of all pages are associatively interrogated whenever any virtual address translation is required. After any such reference, the page usage information contained in the r and m bits must be checked and modified appropriately for the referenced page. When a page is enabled, the r control bit will be set to 1 while the required byte is being obtained from the chip. If the page reference was a "write", then the m bit will be set to 1 as well as r. The u bit is updated only at page fault time. If no page is enabled, a page fault occurs which requires removal of one page from primary storage and swapping in of the required page. The page fault is sensed by page fault and multiple match detector 84.

A scan period occurs whenever an associative compare over $N_v$ bits of all pages produces no match, i.e., no flag, indicating a page fault in detector 84 to initiate the scan operation.

Figure 5:
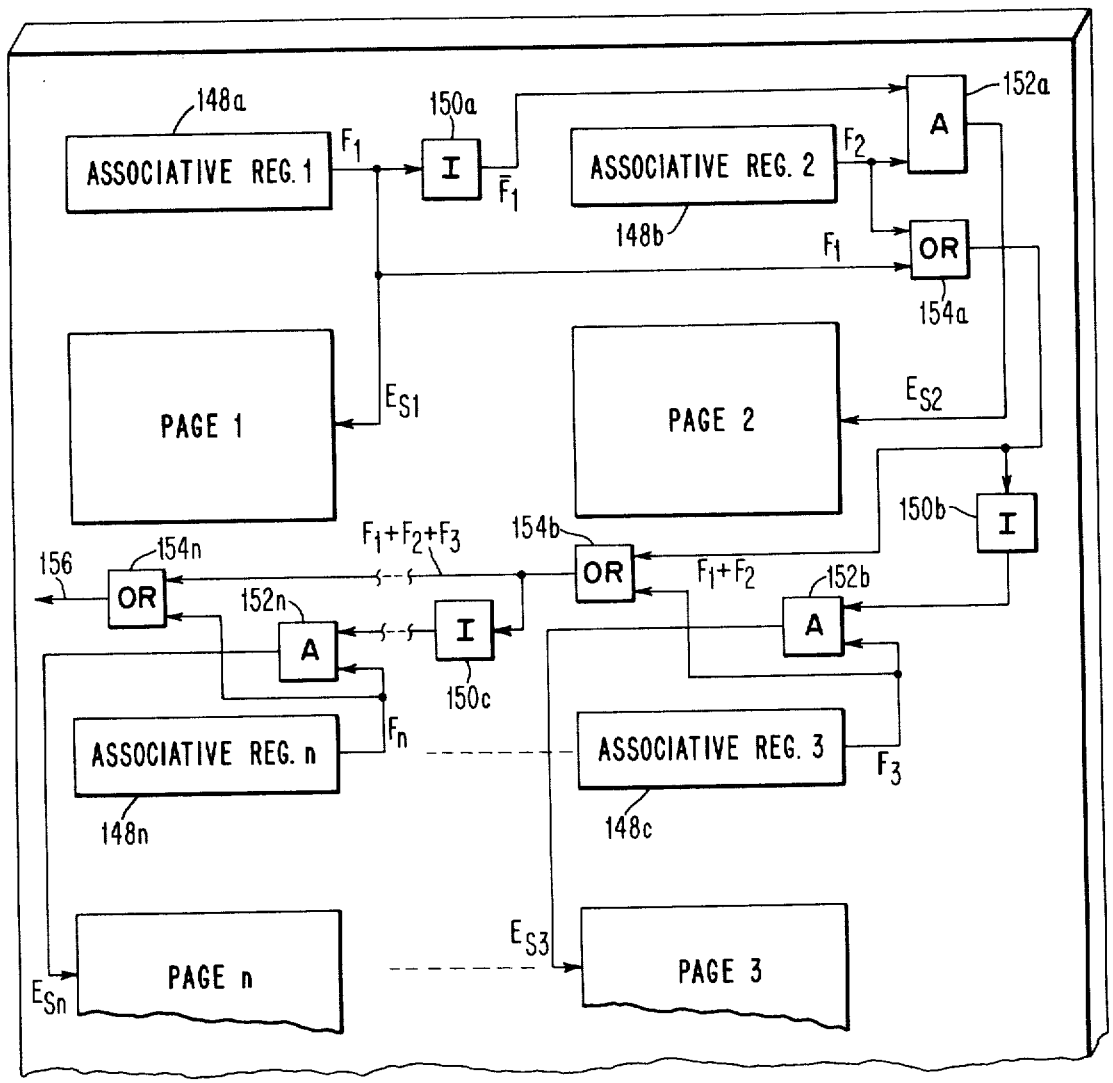
FIG. 5 shows a logic block diagram illustrating the multiple match selector operation for selecting one of a multiple match using one flag per page.

Since any given scan might produce many pages which satisfy the control or use bit criteria for the match, i.e., a multiple match, the multiple match detector 84 includes a selector portion shown in FIG. 5 for logically selecting only one page on the chip. This is accomplished by operating on the chip enable flag lines F out of the associative registers 148a-n. Here, the first associative register 148a of the page 1 has its flag line $F_1$ connected to an inverter 150a to provide an inverted flag signal $\bar{F}_1$. The output or $\bar{F}_1$ line from the inverter 150a is connected to an AND gate 152a together with the flag line $F_2$ out of the associative register 148b of page 2. An OR gate 154a is connected to both flag lines $F_1$ and $F_2$. Similarly, on OR gate 154b is connected to receive the output of OR gate 154a and the $F_3$ flag line. The output of OR gate 154a is inverted by inverter 150b and the inverted signal applied with the $F_3$ output of the associative register 148c of page 3 to an AND gate 152b. The output of AND gate 152a is connected as the enable $E_{s2}$ to page 2, the output of AND gate 152b is connected as the enable $E_{s3}$ to page 3, and so on. This series arrangement of the associative registers of each page continues through each page. The last OR gate 154n provides an output on line 156 which indicates the overall flag condition and whether any page was enabled, such line 156 being similar to the lines 86 and 92 out of detector 84 shown in FIG. 4B.

In this fashion, all pages on a chip are physically ordered so that the first page producing a match is selected. For instance, if Page 1 produces a match at scan time, its enable flag $E_{s1}$ is used to select that page for replacement. If Page 1 does not produce a match and assuming this means the flag $F_1=0$, then its flag is inverted by a simple NOR gate 150a and the output is AND gated at 152a with the flag of Page 2. The output of gate 152a is the page 2 enable $E_{s2}$. Likewise, the output of OR gate 154a is inverted at 150b and AND gated at 152b with the flag of Page 3, and so on. In the above case, the inverted flag of Page 1 will now produce a 1. If Page 2 produces a match the Enable signal $E_{s2}$ will be 1, thereby selecting Page 2 for replacement. If Page 2 does not produce a match, its flag will be zero giving $E_{s2} = 0$. The selection process thus proceeds, logically, through all the serial flag connections, the delay being only that of the serial inverter, the OR and AND gates. One and only one page is selected for replacement, thereby selecting one page on a chip. In a large memory using multiple chips, the same logical connections between chips can be used to select one of the pages of a multiple chip match.

In summary, for high density integrated FET memory chips used in a two level virtual hierarchy, a number of distinct advantages are realized by implementing many of the virtual functions in the on-chip associative registers of the present invention. The incorporation of virtual address translation as well as page usage and control information can be achieved with small amounts of additional FET circuits. Replacement of the conventional chip-enable decoder by a common flag line from the associative register in accordance with the present invention allows all necessary virtual functions to be performed in a simple manner. In addition, most, if not all of the virtual functions can be overlapped with the usual chip addressing. In fact, the associative addressing can be used to further advantage as the delayed chip select generator normally required on-chip. This not only provides the necessary device tracking, but allows overlapping of the virtual decoding with the real decoding.

The hybrid memory of the present invention is applicable to both the usual main memory-disk virtual system, and cache paged out of main memory and provides several advantages. For the main memory-disk type hierarchy, the hybrid scheme permits the replacement of the small, expensive bipolar partial directory by FET registers which perform a full, associative translation within the normal memory access or cycle time. This is achieved by overlapping and integration of functions which must be done separately and sequentially with conventional architecture. In addition to possibly higher speed, the hybrid approach would eliminate the internal page tables used in conventional systems. Furthermore, this scheme with on-chip associative registers would permit easy expandability of memory size. The full associative address Nv (e.g., 30 bits) and control bits are included in all registers, such that adding more capability automatically adds the required virtual hardward. For a cache-main memory two level hierarchy, at least two access delays are currently required, one to the directory and a second access to the cache. The hybrid scheme of the present invention eliminates this double access delay in the manner described above. In addition, a fully associative mapping which is inherent in the hybrid device of the present invention improves the hit ratio for some classes of problems for which the current set associative mapping is not adequate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An associative page addressing system for providing virtual paged stores, comprising:
a plurality of integrated circuit chips, each said chip containing the storage cells for data, at least one associative circuit including a virtual page address register for receiving and storing the virtual address bits assigned to each page located on one or more chips, and means for comparing a stored virtual address with an interrogate virtual address from a CPU and providing a direct page enable output upon a match thereof;
address decoder means connected to receive said page enable output and locate data addressed in said storage cells; and
CPU means including a virtual page address register and a real address register, said virtual page address register of said CPU means being connected to said virtual address register on each chip for interrogating said chips when a page request is made, said real address register storing the real address bits which are applied to said address decoder means for selecting a byte of data from said storage cells in the chips; whereby a matched virtual page address produces an enable output from said comparing means and directly enables the selected chip to be accessed at those locations addressed by said real address register.

2. A system as recited in claim 1, further comprising, on each of said chips, at least on page usage information register for storing data relating to the usage of a given page for determining eligibility of a page for replacement.

3. A system as recited in claim 2, wherein each said page information register includes means for storing page usage control bits and means for comparing the stored page usage control bits with interrogate control bits and providing a flag output upon a match thereof for selecting a page for replacement.

4. A system as recited in claim 2, further comprising page fault gating means connected to the outputs of each of said virtual address comparing means, for detecting that none of said chips have been enabled by a match of its virtual address interrogated by the CPU means, thereby providing a page fault indication.

5. A system as recited in claim 4, further comprising a page replacement scanner, responsive to said page fault gating means, for interrogating said page usage information registers on each chip.

6. A system as recited in claim 2, wherein one of said page usage information registers includes a reference bit register for indicating whether a page has been used over a given time period, and means for updating said reference bit register when its respective page has been used.

7. A system as recited in claim 2, wherein the page usage information registers include a modified bit register for indicating whether a page has been written into, and means for updating said modified bit register.

8. A system as recited in claim 2, further comprising multiple match selection means for selecting a page determined to be eligible for replacement, said multiple match selection means including gating means for preventing more than one of said pages from being replaced at a time.

9. A system as recited in claim 8, further comprising register reset means connected for receiving the output of said multiple match selection means and initiating accessing of the page and the resetting of control information registers located on each chip for storing data relating to the usage of a given page.

10. A system as recited in claim 9, wherein said multiple match selection means provides a page enabled signal which is used to initiate a page swapping cycle for the enabled chip or page.

11. A system as recited in claim 2, further comprising means for interrogating the page usage information registers on each chip, and bit update means, responsive to said interrogating means, for setting the information contained in such registers in accordance with whether its respective page was enabled or selected in a last scan cycle.

12. A system as recited in claim 11, further comprising a programmable control means associated with said interrogation means and said bit update means for setting the conditions under which the pages are replaced.

13. A system as recited in claim 2, further comprising means for detecting the control information stored in said page usage information registers on each chip, page select means responsive to said detecting means, for selecting one page for replacement, and means for writing a virtual address into any virtual page address register upon replacement of a respective page.

14. A system as recited in claim 1, further comprising gating means connected between said enable output of said comparing means and said address decoder means for enabling said chip storage cells to be accessed, each of said gating means being serially connected to each other and each chip enable output such that the first chip to be enabled in the serial line will thereby prevent any subsequent chips from being enabled at that time for access, whereby said gating means provides for the selection of one chip of a multiple chip match condition.

15. A system as recited in claim 1, further comprising on each chip a control register means for storing page usage data concerning the usage of a given page and its eligibility for replacement, the output of said control register means being connected to a page fault and multiple match detector which indicates whether a page has been enabled.

16. A system as recited in claim 15, further comprising a page scanner connected to the output of said page fault and multiple match detector, said page scanner connected to each chip for interrogating said control register means thereon for updating said control register means and replacing pages.

17. A system as recited in claim 15, wherein said direct enable output from said virtual address comparing means is applied on a common flag line with the output from said page usage control register means, said flag line being connected to the input to a page fault and multiple match detector for indicating whether a page has been enabled and for selecting one of a multiple page match.

18. A system as recited in claim 1 wherein each chip contains one page.

19. A system as recited in claim 1, wherein said address decoder means includes a bit decoder and a real word decoder for receiving the word and bit comprising the real address in said real address register.

20. A system as recited in claim 1, wherein said virtual page address register of said CPU means is connected to the virtual address register on each chip, and interrogate means are provided for interrogating each virtual address register at the same time that said address decoder means locates data in said storage cells, whereby decoding of the virtual page address registers is overlapped with the decoding of bit group and word line selection of the storage cells.

21. A system as recited in claim 1, wherein said virtual page address register on each chip comprises a basic four FET device flip-flop and said comparing means comprises FET transistors for comparing the virtual address stored in said virtual address register with the bits comprising the virtual address received on bit lines for interrogation.

22. A system as recited in claim 21, further comprising, at the output of said comparing means, an enable gate for enabling the output of said comparing means to be provided on an output enable line only when an interrogate signal is provided at said enable gate.

23. A two level, hierarchical storage device for providing a fully associative virtual page address translation function, comprising:
a plurality of integrated circuit chips, each of which includes an associative virtual page address register physically located on chip including both means for receiving and storing the virtual address bits assigned to a page located on one or more chips, and means for comparing a stored virtual address with an interrogate virtual address from a CPU and providing a direct chip or page enable output upon a match thereof for directly enabling a chip memory to be accessed at those locations addressed by the CPU, whereby fully associative compare operations are carried out with all virtual addresses directly on chip.

24. A device as recited in claim 23, further comprising, on each chip, address decoder means for locating data stored in the chip memory and addressed by the CPU, said address decoder means being connected to be enabled by said page enable output.

25. A device as recited in claim 23, further comprising, on each of said circuit chips, one or more control registers of storing page usage and update information for providing information to a CPU control means for selecting a page for replacement when a page fault occurs.

26. A device as recited in claim 25, wherein the output of said means for comparing said stored virtual addresses is connected to the output of said control registers to provide a common associative flag line.

27. A device as recited in claim 25, wherein said control registers include a reference bit register for indicating whether a page has been used over some period of time.

28. A device as recited in claim 25, wherein said control registers include a modified bit register containing a bit for indicating whether a page has been modified or written into.

29. A device as recited in claim 25, wherein said control registers include an unreferenced interval count register containing a bit for specifying the number of scan intervals over which its respective page was not referenced.

30. A device as recited in claim 25, wherein each of said control registers for storing page usage and update information includes means for comparing control data stored in said control registers with interrogate control data from the CPU and producing a flag match output.

31. A device as recited in claim 30, further comprising gating means connecting said control registers including the outputs of their comparing means in a series arrangement, said gating means selecting the first page in the series sequence which produces a flag match output.

32. A device as recited in claim 23, further comprising gating means connected to said page enable output for detecting a page fault condition whereby none of the pages produces a match of their stored virtual addresses with the interrogated virtual address.

33. A two level, hierarchical storage device for providing a fully associative virtual page address translation function, comprising:
a plurality of integrated circuit chips, each of which includes an associative virtual page address register physically located on chip and having both means for receiving and storing the virtual address bits assigned to a page, and means for comparing a stored virtual address with an interrogate virtual address from a CPU and providing a chip or page enable directly on chip, a data storage array on each chip, and address decoder means for locating data addressed in the data storage arrays from the CPU, said chip enable serving to directly enable the data storage array to be accessed at those locations in said address decoder means; whereby a fully associative virtual page address translation function is provided directly on chip.

34. A device as recited in claim 33, further comprising on each of said circuit chips one or more control registers for storing page usage and update information, and a CPU storage control for selecting a page for replacement when a page fault occurs.

35. A device as recited in claim 34, wherein each of said control registers is an associative register having a means for comparing control data stored in said control registers with interrogate control data from the CPU storage control and producing a flag match output.

36. A device as recited in claim 35, wherein the output of said means for comparing said virtual addresses is connected to the output of said means for comparing said control data to provide a common associative flag line.

* * * * *

UNITED STATES PATENT AND TRADEMARK OFFICE
CERTIFICATE OF CORRECTION

PATENT NO. : 4,084,230
DATED : April 11, 1978
INVENTOR(S) : Richard Edward Matick It is certified that error appears in the above-identified patent and that said Letters Patent are hereby corrected as shown below:

Column 13, line 59, "on", second occurrence, should read --one--.

Column 14, line 46, "interrogation" should read --interrogating--.

Column 15, line 43, "at" should read --to--;

Column 15, line 67, "of storing" should read --for storing--.

Column 16, line 41, after "storing" delete "the".

Signed and Sealed this

Eleventh Day of December 1979

[SEAL]

Attest:

SIDNEY A. DIAMOND

Attesting Officer

Commissioner of Patents and Trademarks